United States Patent [19]

Miller

[11] 3,906,792

[45] Sept. 23, 1975

[54] VARIABLE THROAT VENTURI AIRSPEED SENSOR

[75] Inventor: Harry Miller, Scottsdale, Ariz.

[73] Assignee: Sperry Rand Corporation, New York, N.Y.

[22] Filed: Oct. 17, 1973

[21] Appl. No.: 407,366

Related U.S. Application Data

[63] Continuation-in-part of Ser. No. 237,425, March 23, 1972, Pat. No. 3,795,145.

[52] U.S. Cl. .................. 73/213; 73/180; 73/182; 137/45
[51] Int. Cl.² .......................................... G01F 1/44
[58] Field of Search ........ 73/213, 180, 182; 138/45; 137/487, 487.5

[56] References Cited
UNITED STATES PATENTS

| | | | |
|---|---|---|---|
| 2,546,673 | 3/1951 | Mattix et al. | 138/45 |
| 2,749,749 | 6/1956 | Billman et al. | 73/182 |
| 3,428,079 | 2/1969 | Wylupek | 137/486 |
| 3,724,503 | 4/1973 | Cooke | 73/213 X |
| 3,795,145 | 3/1974 | Miller | 73/213 |

OTHER PUBLICATIONS

Buzzard, ISA Journal, Variable Orifice Flow Meter, March, 1963, pp. 80 & 81, 73–207.

Primary Examiner—Richard C. Queisser
Assistant Examiner—John P. Beauchamp
Attorney, Agent, or Firm—Howard P. Terry; Joseph M. Roehl

[57] ABSTRACT

An airspeed sensor utilizes a venturi in which the throat area is adjusted as a function of the measured pressures in the inlet region and the throat region of the venturi. The throat area is programmed by a servo to obtain a pressure ratio between inlet and throat pressures which is a single-valued function of the Mach number of the air flow at the entrance to the venturi. A measure of the angle of incidence of the air flow may be obtained by using two parallel variable throat venturis and a servo to orient the entry of the venturis in a manner to divide the flow equally.

13 Claims, 6 Drawing Figures

VARIABLE THROAT VENTURI AIRSPEED SENSOR

This is a continuation-in-part of U.S. Pat. application Ser. No. 237,425, now U.S. Pat. No. 3,795,145, filed in the name of the present inventor on Mar. 23, 1972 and assigned to the present assignee.

BACKGROUND OF THE INVENTION

1. Field of the Invention

This invention relates to an airspeed measuring device and more specifically to a venturi type airspeed measuring device having an extended operating range.

2. Description of the Prior Art

Air flow is frequently measured by means of Pitot techniques. However, measurement of low velocity air flow by means of these techniques is limited in that such techniques depend upon a square law relationship between velocity and impact pressure. This results in extremely low sensitivity at lower speeds. Airspeed systems depending upon venturi principles are also frequently used for such measurements. Although the prior art venturi systems manifest an improved sensitivity at the lower speeds, their range is somewhat limited in that a device designed to operate at lower airspeeds is unsuitable at the higher airspeeds and conversely, devices designed principally for high speed operation are unsuitable at the lower airspeeds. Furthermore, in applications where the angle of air flow incidence is to be measured in conjunction with such prior art devices, such measurements are frequently made by the use of vanes which are inserted into the airstream. The vanes are not capable of measuring incidence angles when the flow velocity is low since there is insufficient torque available from the stream to rotate the vane to the flow direction. Still other prior art techniques for measuring the angle of air flow utilize measurement of the stagnation pressures of two probes which have a fixed angular relationship between them and rotating both probes simultaneously until the measured pressures are equal. However, these latter devices are not suitable for measuring air flow direction when the air flow is low because of the extremely low values of stagnation pressure.

SUMMARY OF THE INVENTION

The venturi-type airspeed sensor of the present invention permits the measurement of air velocity over a wide region by employing a variable throat area which is programmed by a servo as a function of the pressure ratio between inlet and throat so as to cause the pressure ratio to be a function of the Mach number of the air flow at the entrance of the venturi. The invention further permits a measurement of the direction of air flow by utilizing parallel variable throat venturis whose orientation with respect to the incident air flow is programmed by a second servo to divide the flow equally through the parallel venturis.

DESCRIPTION OF THE PREFERRED EMBODIMENTS

Figure 1:
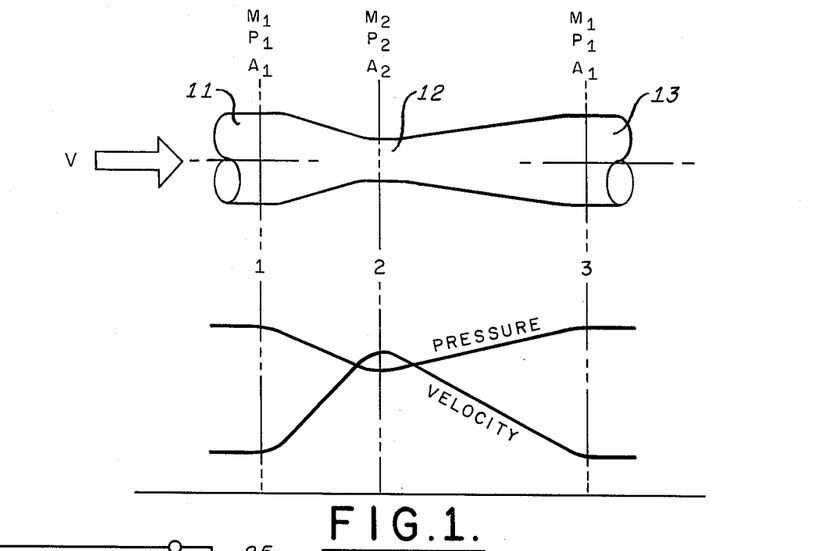
FIG. 1 is a diagram useful in explaining the invention.

Referring now to FIG. 1, a conventional venturi inserted in a pipeline carrying a compressible fluid moving at a velocity V carries the fluid whose flow rate is to be measured. The fluid enters an inlet portion 11 and flows downstream toward the right through a constricted throat area 12 where its pressure is decreased and its velocity increased in accordance with relationships that are well known in the field of fluid mechanics. The flow continues through an expanding cross-section until it reaches the outlet 13 whose area is equal to that of the inlet 11. FIG. 1 also illustrates graphically the qualitative history of the pressure and velocity experienced by the fluid as it flows through the venturi. By means of conoventional design techniques, the flow process through the venturi may be maintained essentially reversible and adiabatic, that is: without turbulence and without transfer of heat. Under these conditions, the pressure and velocity at the outlet 13 will be equal to that at the inlet 11 if the cross-sectional areas are equal. The state of the fluid at the various stations of the venturi is defined by its static pressure, P, the flow Mach number, M, and the cross-sectional area, A. The stations of interest are the inlet 11 and the throat 12. The fluid state is defined for these stations as $P_1$, $M_1$, $A_1$ and $P_2$, $M_2$, $A_2$.

Assuming that the fluid in which a venturi is to be operated in air, it can be shown that the following relationship exists between the inlet Mach number, the pressure ratio, and the area ratio:

$$M_1^2 = 5 \left\{ \frac{1 - \left(\frac{P_2}{P_1}\right)^{\frac{1}{3.5}}}{\left(\frac{A_1}{A_2}\right)^2 \left(\frac{P_1}{P_2}\right)^{\frac{5}{3.5}} - 1} \right\} \quad (1)$$

The foregoing expression is applicable to reversible adiabatic flow processes that involve diatomic gases such as air. The reversible adiabatic operating characteristics of venturi devices may be better visualized by referring to the graphical representation of the foregoing formula illustrated in FIG. 2 wherein the pressure ratios between throat and inlet are plotted as a function of inlet Mach number for several venturis having different but constant area ratios. Thus, for example, a venturi having an area ratio of 0.1 will manifest a significant pressure ratio change compared to the zero flow value of 1.0 for relatively low Mach numbers. However, such a device will saturate at Mach numbers approaching 0.05 at which value the flow process will become irreversible and the venturi would have no utility for entering flow Mach numbers that are greater than 0.05.

On the other hand, a venturi having an area ratio of 0.8 would experience no significant pressure ratio change compared to the zero flow value of 1.0 in the lower speed range, but would be increasingly sensitive in the mid-speed range where the air velocity approaches Mach 0.5. Further inspection of FIG. 2 reveals that the venturi may be utilized for supersonic flow by allowing the area ratio to become greater than unity.

The present invention utilizes a venturi having fixed inlet and outlet cross-sectional areas and a variable throat area which is adjusted in accordance with the existing pressure ratio so as to provide a suitable inlet-to-throat area ratio corresponding to the sensed pressure ratio. By this means, the venturi can be maintained in a favorable and reversible operating region regardless of the particular inlet flow Mach number. The characteristic curves of FIG. 2 can be utilized to design a particular variable throat venturi by first selecting a suitable operating curve such as the curve 14. Having selected a suitable operating curve, the area ratios corresponding to various sensed pressure ratios can be readily determined and a suitable driving circuit can then be devised to adjust the throat area as a function of the sensed pressure ratio.

Figure 2:
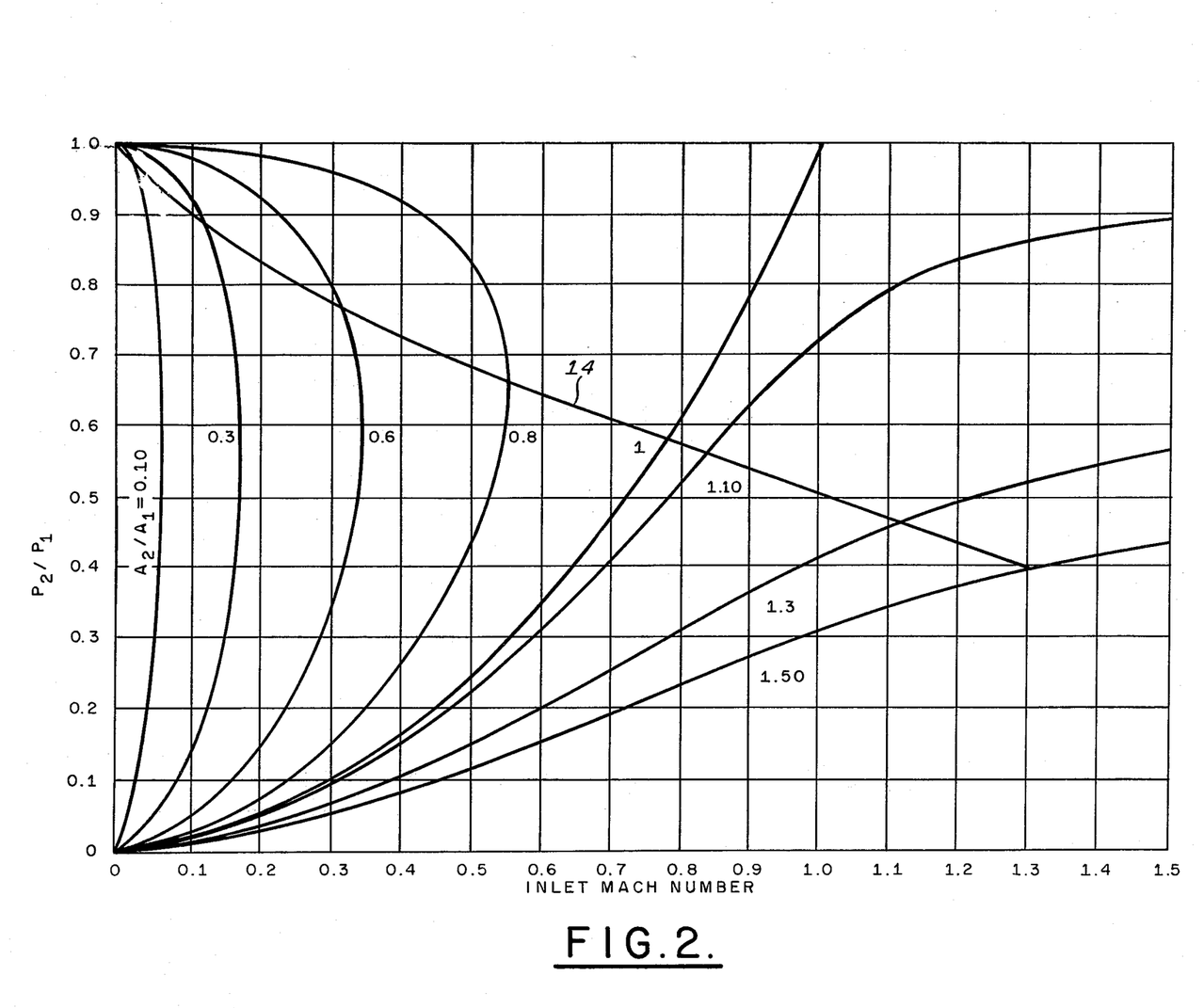
FIG. 2 is a graph illustrating certain characteristics of a device constructed in accordance with the principles of the inventin.

Thus, for the particular characteristics shown in FIG. 2, such a device would provide an area ratio of about 0.05 as the sensed pressure ratio approached unity and a continually increasing area ratio which would become approximately 1.0 when the pressure ratio became 0.58. If the device were to extend into the supersonic range, provision would be made to further increase the area ratio to 1.5 when the pressure ratio became 0.39.

It will be appreciated that the particular operating curve 14 of FIG. 2 is merely illustrative of a typical device built in accordance with the principles of the invention. The exact nature of a specific operating curve is determined by the circuit parameters used in a given device as will become evident as the description proceeds.

An examination of equation 1 indicates that it represents a relationship between three variables, of which two are independent and the third is dependent. In the variable throat venturi system of the present invention, the equation is effectively reduced to an expression containing a single independent variable by forcing the area ratio $A_2/A_1$ to be a specific function of the pressure ratio $P_2/P_1$. This is ordinarily accomplished by providing a servo loop which positions the throat mechanism as a function of the pressure ratio through the use of a feedback potentiometer as illustrated in the system schematic of FIG. 3.

Figure 3:
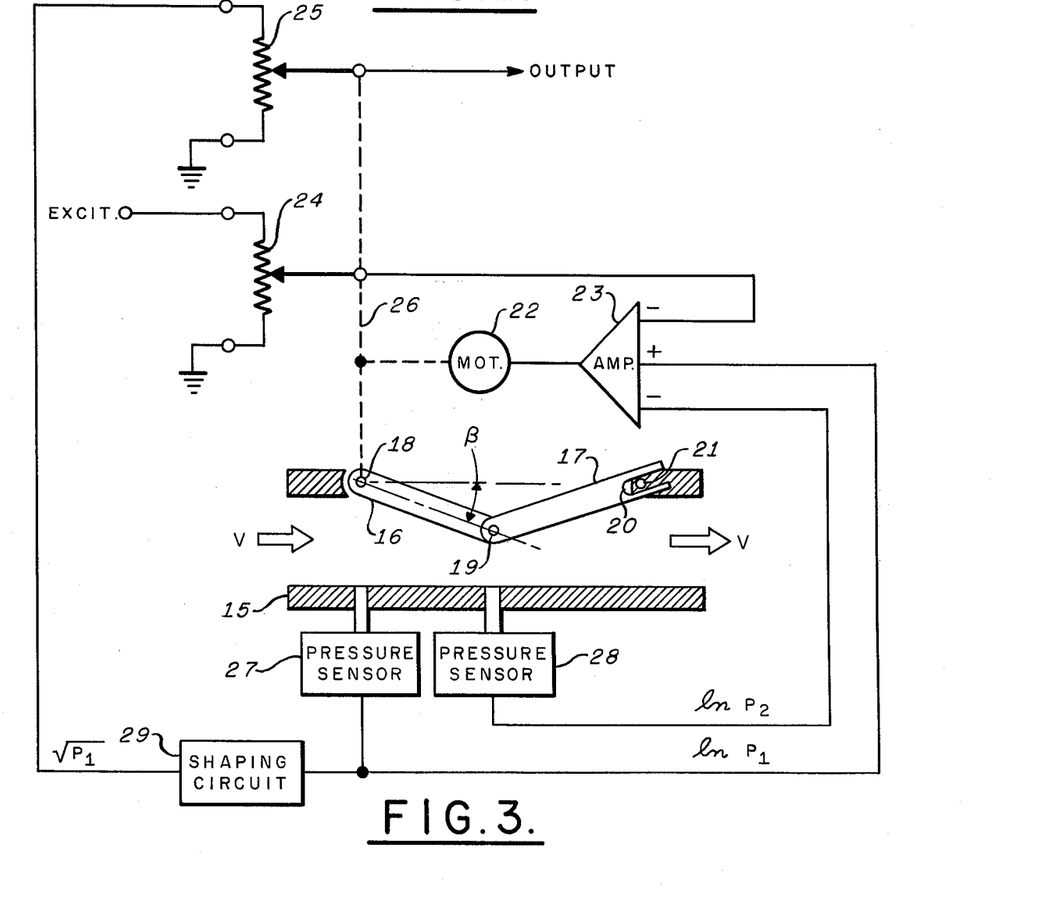
FIG. 3 is a schematic diagram illustrating means by which the velocity of air flow may be measured in accordance with the teachings of the invention.

In FIG. 3, a variable throat venturi 15 is exposed to an air flow entering the venturi at a velocity, V. Adjustable ramp members 16 and 17 are hinged about transverse axes 18 and 19, respectively. The axis 19 forms the apex of a generally triangular throat section. The motion of the downstream ramp member 17 is further constrained by providing the downstream end of this member with a slot 20 which engages a pivot pin 21 fixed to the stationary upper wall of the venturi 15. This assures that the exit area of the venturi remains the same as the entrance area. In order to assure that there is no fluid leakage across the variable throat mechanism, the ramps 16 and 17 and the pivots 18 and 19 are carefully sealed with respect to the fixed portions of the venturi by suitable sealing elements such as "O" rings in the pivot areas and linear compression seals along the lengths of the ramps where they contact the side walls of the venturi. The angular setting of the throat-ramp 16 and thus the vertical dimension of the throat is adjusted by means of a servo motor 22 acting in accordance with signals produced by a servo amplifier 23. A position feedback potentiometer 24 and a signal output potentiometer 25 each contain adjustable arms whose positions are mechanically set by the servo motor 22 through a shaft 26 which is geared to drive elements 16 and 17 at the pivot 18.

The fluid pressures at the inlet and throat portions are detected by pressure sensors 27 and 28, respectively. As presently preferred, each pressure sensor includes a transducer designed to produce an output signal representative of the logarithm of the absolute pressures detected by that sensor. The logarithmic signals from each pressure sensor are applied to input terminals of the servo amplifier 23 in a subtractive relationship so as to provide a ratio signal to the amplifier.

The feedback potentiometer 24 typically has a linear characteristic with respect to movement of the shaft 26. The output signal from the potentiometer 24 is applied to the servo amplifier 23 as negative position feedback.

The signal output potentiometer 25 is energized through a shaping circuit 29 in accordance with the output signal of the pressure sensor 27. The shaping circuit 29 converts the logarithmic signal from the pressure sensor 27 into a signal which is proportional to the square root of the absolute pressure sensed by the sensor 27. The shaping circuit 29 is of straightforward and conventional design and may, for instance, include a first circuit for taking the anti-logarithm of the input signal and a square root loop. Circuits suitable for this purpose are described, for instance, in "Electronic Analog and Hybrid Computers" by Korn and Korn published by McGraw-Hill Company in 1964 and the references cited therein. As mentioned previously, the feedback potentiometer 24 has a linear characteristic. Since this potentiometer is energized from a source of steady voltage, the negative feedback signal supplied to the servo amplifier 23 from this potentiometer is a linear function of the angular displacement data of the adjustable throat member 16. It can be seen that the area in the throat region of the venturi is a function of the tangent of the angle $\beta$. The angle $\beta$ is determined when the sum of the input signals to the amplifier 23 is at a null. The angle $\beta$ is equal to a constant determined by the characteristics of the feedback potentiometer 24 minus a multiplying factor times the log of the ratio $P_2/P_1$ or $\beta = K_1 - K_2 \ln(P_2/P_1)$. This, then is the equation solved by the ramp position servo loop of FIG. 3.

In a particular design, given by way of example, a rectangular venturi had an entry cross section of one inch by one inch, the center of shaft 18 was 1.559 inches above the inner surface of the lower wall of the venturi, and the distance from the pivot 18 to the port of pressure sensor 28 was 1.750 inches. For this particular example, the area ratio $A_2/A_1$ is given by the following relationship:

$$A_2/A_1 = 1.75(.8909 - \tan\beta) \tag{2}$$

The relationship between shaft position and $\ln(P_2/P_1)$ is given by:

$$\beta = 40.706 - 95.9 \ln(P_2/P_1) \tag{3}$$

It will be noted that equation (2) expresses area ratio in terms of ramp angle $\beta$ and equation (3) expresses ramp angle $\beta$ in terms of pressure ratio. Therefore, by conventional mathematical manipulation, equations (2) and (3) may be substituted in equation (1) resulting in a single-valued relationship between inlet Mach number and ramp angle $\beta$.

The signal output potentiometer 25 may be proportioned to provide any desired output signal. For example, equivalent airspeed may be derived from the inlet Mach number and the entry static pressure by the known formula:

$$V_e = 24.27 \, M_1 \, \sqrt{P_1} \qquad (4)$$

where:

$V_e$ = the equivalent airspeed in knots and the pressure is in pounds per square foot.

Since the output potentiometer is energized by a voltage representative of the square root of $P_1$ and the position of the potentiometer arm is a function of $M_1$, the output potentiometer effectively multiplies these two variables.

In a well-designed venturi, the air flows through and around the venturi in a substantially streamlined fashion so that the air entering the venturi can be assumed to be the same velocity as the velocity of the venturi with respect to the ambient. Since the angle $\beta$ is a single-valued function of the inlet Mach number, the potentiometer 25 can be proportioned by straightforward analytical or graphical techniques so that the shape of its resistance curve provides a desired output signal.

It will be appreciated that the characteristics of the operating curve 14 of FIG. 2 can be modified within wide limits by adjusting the circuit parameters in accordance with well known design techniques. Thus, for instance, the sensitivity of the system can be altered by changing the feedback factor. Although a linear characteristic is ordinarily desired, a non-linear characteristic could be provided to meet the requirements of special applications.

Although a specific control circuit has been described, it will be appreciated that many variants of the circuit could be employed to perform the necessary function of adjusting the throat area in accordance with sensed inlet and throat pressures. Thus, for instance, the circuit of FIG. 3 utilizes pressure sensors which provide logarithmic output signals which are subtracted in the servo amplifier 23 so as to provide a signal indicative of the ratio of the two pressures. It will be obvious that any one of a number of known computer schemes for obtaining a signal indicative of the same pressure ratio may be employed if desired. Similarly, the output potentiometer 25 functions as a multiplier. Other known types of multipliers may be used rather than the potentiometer if desired.

In some instances, it may be important to determine the angle of flow of the fluid with respect to a reference axis. Such applications may arise, for instance, in aircraft installations where it may be desired to measure the sideslip or angle of attack of the aircraft as well as the aircraft's airspeed.

Figure 4:
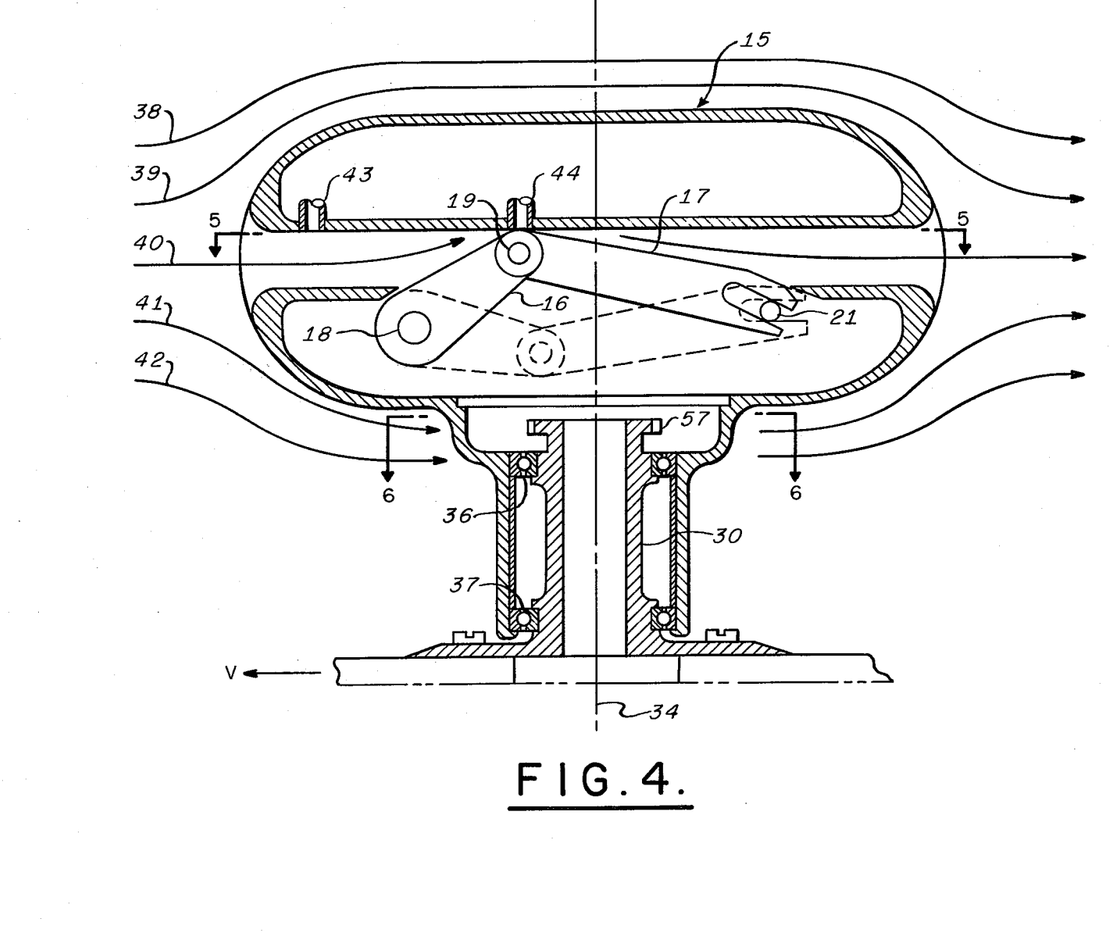
FIG. 4 is a cross-sectional view illustrating a device constructed in accordance with the teachings of the invention.

FIG. 4 is a simplified longitudinal cross-sectional view of a presently preferred embodiment of the invention arranged to measure both the magnitude and direction of air flow with respect to an aircraft. The streamlined venturi housing 15 is mounted on support 30 for rotation about an axis 34 through ball-bearing members 36 and 37. The movement of the aircraft at a velocity V with respect to the air mass will generate air stream lines 38, 39, 40, 41 and 42. A typical streamline 40 enters the venturi housing 15, flows past the ramps 16 and 17, and exits the venturi to rejoin the remaining streamlines 38, 39, 41 and 42. Because of the shape of the housing 15, the streamlines at the entrance of the venturi have similar orientation and velocity to those at the exit of the venturi. This provides an essentially reversible flow process with minimum turbulence at the entrance and exit of the venturi.

The variable throat mechanism consists of the ramp members 16 and 17, and the pivots 18, 19 and 21, positioned by a shaft 18 as explained with respect to the correspondingly numbered elements in FIG. 3. The position of the ramp members pictured in FIG. 4 represents a condition which would ococur at very low air flow velocity, in that the throat area is severely restricted so as to provide a low $A_2/A_1$ ratio. As the air flow velocity increases, the throat area would be increased correspondingly. If the air flow velocity is increased into the supersonic region, the pivot 19 continues to move downward so that the throat area becomes larger than the inlet cross-sectional area as required by the graph of FIG. 2, and depicted in dashed form in FIG. 4.

The inlet and throat pressures are sensed at ports 43 and 44, respectively.

Figure 5:
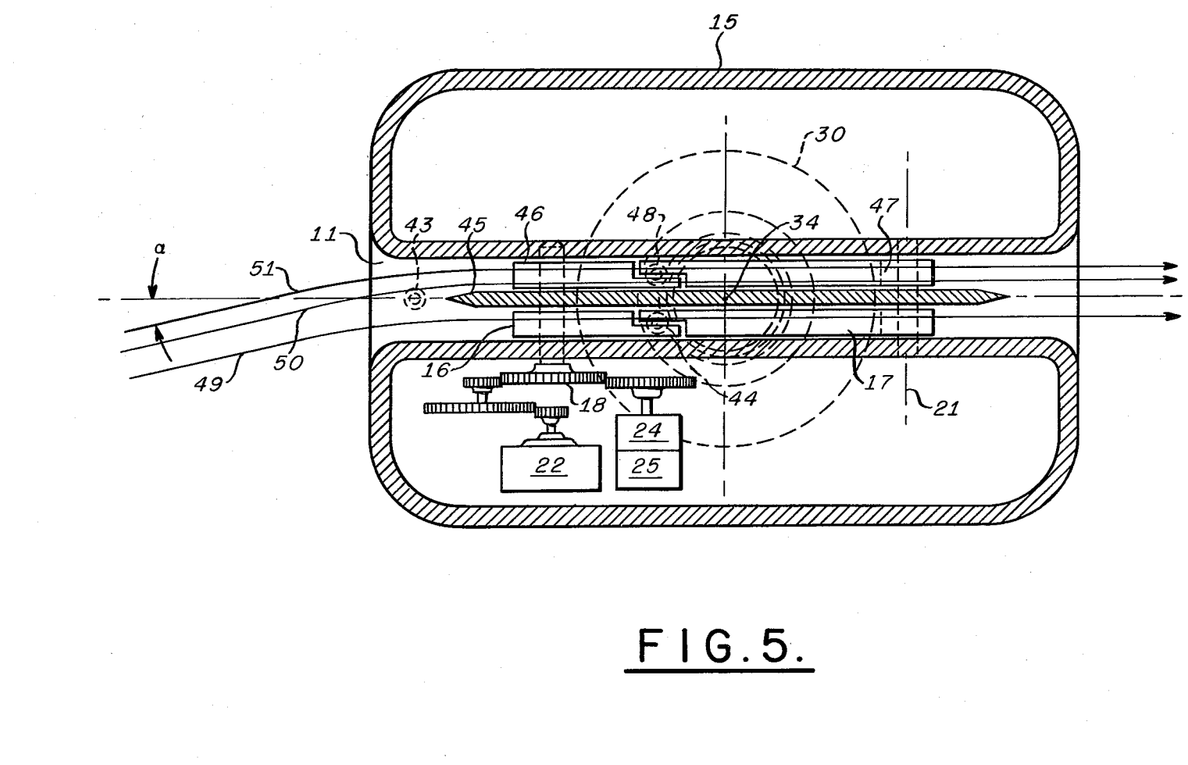
FIG. 5 is a cross-sectional view of a device constructed in accordance with the teachings of the invention for measuring both velocity and direction of incident air flow.

FIG. 5 represents a cross-sectional view taken along the line 5—5 of FIG. 4 and illustrates the parallel venturis used in sensing the direction of air flow entering the device. The individual venturis are separated by a partition 45 which is set back from the ends of the housing and tapered to divide the air flow with minimum turbulence.

The second venturi contains a pair of parallel ramp members 46 and 47.

It will be appreciated that although the various ramps are depicted as being spaced from the respective interior walls, in practice these members are provided with resilient material along their lengths and at their pivot points so as to provide a tightly sealed junction with the walls to prevent any leakage of fluid which would otherwise affect the accuracy of the measurements.

The shaft 18 is rigidly attached to both upstream ramps 16 and 46 so that both venturis are adjusted simultaneously by means of the motor 22. The inlet pressure is detected at the common input port 43 which communicates with the pressure sensor 27 of FIG. 3. The pressure at the throat of the first venturi is detected at the port 44 which communicates with the pressure sensor 28 also shown in FIG. 3. The signals from these two pressure sensors are processed in the circuit of FIG. 3 to provide the equivalent air speed output signal and control of the throat areas.

The throat pressure of the second venturi is detected at a throat port 48. If air flow enters the device along streamlines 49, 50, and 51 at an angle $\alpha$ with respect to the center line extension of the dividing wall 45, more fluid will flow through the second venturi containing the ramps 46 and 47 than will flow through the first venturi containing the ramps 16 and 17. Under these circumstances, a pressure differential will exist between the pressures detected at the throat ports 44 and 48. The pressure detected at the throat port 48 is applied to a pressure sensor identical to the pressure sensor 28 associated with the throat port 44 so as to produce a signal ln $P_3$ which may be compared with the corresponding signal ln $P_2$ from the pressure sensor 28 so as to provide an error signal which may be used to rotate the device about its axis 34 until the pressures detected at the throat ports 44 and 48 are equalized.

Figure 6:
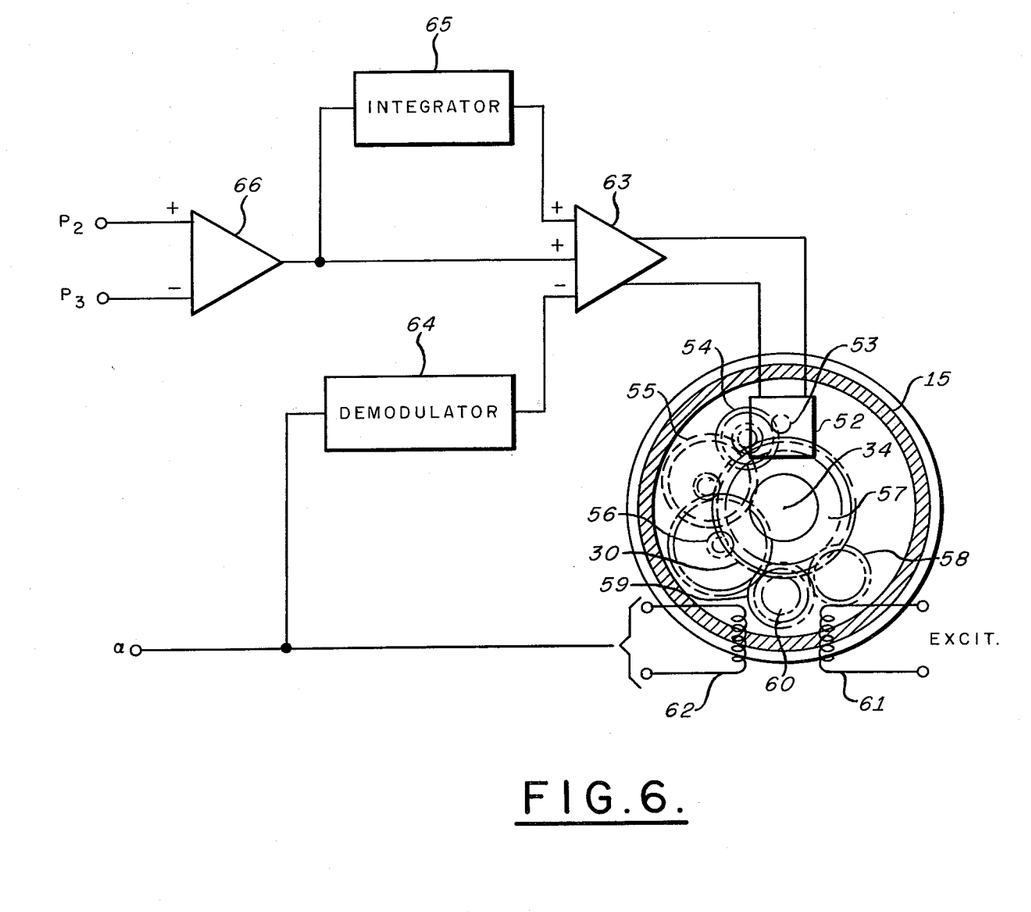
FIG. 6 is a diagram illustrating means by which the device of FIG. 5 may be aligned with the incident air flow.

FIG. 6 illustrates the means by which this equalization may be accomplished. FIG. 6 is a cross-sectional view taken along the line 6—6 of FIG. 4 and includes a simplified schematic indicating a preferred closed loop servo means for rotating housing member 15 so that the entering flow lines are aligned with the direction of the dividing wall 45.

As previously described with respect to FIG. 4, the support member 30 is rigidly attached to the aircraft structure.

A driving motor 52 contains a pinion 53 which operates through reduction gears 54, 55 and 56 to form a planetary arrangement with a fixed sun gear 57 which is fixedly mounted on the end of the support member 30. Therefore, movement of motor pinion 53 operates through the gear cluster and the stationary gear 57 to cause the housing 15 to rotate about its axis 34.

An idler gear 58 is in mesh with fixed gear 57 and a gear 59 attached to the shaft of a synchro transmitter 60. The motor 52, the synchro 60, and the shafts of the planetary gears are all attached to the rotatable housing 15. Thus the rotor of the synchro 60 is caused to rotate in proportion to the angular movement of the housing 15 about its axis 34.

A synchro excitation coil 61 is energized from an external source so that a phase-reversing modulated voltage, which is proportional to the angular rotation of the synchro motor from its null position, is produced in the output coil 62 of the synchro. The voltage output from coil 62 is coupled to a motor driving amplifier 63 through a demodulator 64. The signal from the coil 62 operates as a negative feedback signal indicative of the rotary position of the housing 15. The amplifier 63 is also coupled through an integrator 65 to a difference amplifier 66. The amplifier 66 receives ln $P_2$ and ln $P_3$ signals from the pressure sensors associated with the throat ports 44 and 48 respectively.

The difference amplifier 66 is also directly coupled to one input of the motor driving amplifier 63. This direct coupling provides an initial error signal when the difference amplifier 66 detects a difference between its two input signals. The integrator 65 provides a cumulative voltage against which the voltage from the demodulator can be balanced when the null position is approached. This arrangement of components is known in the prior art.

In operation, the motor pinion 53 will be caused to rotate until the pressures at the throat ports 44 and 48 become equal. The angular or rotational displacement of the housing 15 as sensed by rotation of the rotor of synchro 60 will be a measure of the orientation of the streamlines 49, 50 and 51 relative to the aircraft structure. The signal output from the synchro 60 will therefore be a measure of the angle of attack or the angle of sideslip of the aircraft depending upon the placement of the housing relative to the aircraft fuselage.

While the inventive concept of the present invention has been described in connection with a single preferred structural embodiment, other embodiments of the concept will be apparent to those skilled in the art. For example, instead of the hinged rotatable ramps 16 and 17, positioned through the angle $\beta$ by the servo system, a single triangular plate having its apex opposite the throat port may be linearly translated across the venturi channel by a rack and pinion driven by the servo. Alternatively, the ramp 16 may be provided with a pin and slot arrangement similar to that of ramp 17 and the pivot point 19 therebetween may be translated across the venturi channel by a similar linear drive arrangement.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for measuring fluid flow velocity over a wide range of velocities comprising
  A. venturi defining means having inlet and outlet portions responsive to said fluid flow and having substantially equal, predetermined, fixed cross-sectional areas, and positionable means between said inlet and outlet portions for defining a throat portion of variable cross-sectional area, said positionable means including first and second inclined surfaces defining an apex and providing continuous transitions between said inlet and throat portions and said throat and outlet portions respectively,
  B. means for mounting said venturi defining means on a supporting surface,
  C. means for detecting fluid pressures in said throat portion and in one of said inlet and outlet portions respectively,
  D. means responsive to a ratio of pressures detected in said throat portion and in said one of said inlet and outlet portions for positioning said positionable means in a sense and to an amount to provide a predetermined pressure relationship between said pressures, the position of said positionable means then obtaining corresponding to a predetermined function of said fluid flow velocity, and
  E. means responsive to said positioning means and the pressure at said one of the inlet and outlet portions for providing an output signal proportional to the velocity of said fluid flow.

2. The fluid flow velocity measuring apparatus of claim 1 being further characterized in that:
  A. said mounting means includes means for rotating said venturi defining means relative to the direction of said fluid flow,
  B. said throat portion includes a longitudinally disposed partition dividing said throat portion into first and second parallel channels,
  C. said means for detecting fluid pressures in said throat portion includes individual means for detecting fluid pressures in each of said parallel channels,
  D. said mounting means further includes means responsive to differential pressures detected in the parallel channels of said throat portion for rotating said venturi defining means in a sense and to an amount to reduce said differential pressure to zero, the angular position of said channel then obtaining corresponding to the direction of said fluid flow relative to said support means.

3. The apparatus of claim 1 wherein said positioning means includes a follow-up servo loop including motive means connected to position said positionable means and follow-up means positioned by said motive means for controlling the position of said positionable means in accordance with said predetermined pressure relationship.

4. The apparatus set forth in claim 1 wherein the fluid velocity is the velocity of air relative to an aircraft and wherein said predetermined function of said fluid flow velocity is a function of Mach airspeed.

5. The fluid flow velocity measuring apparatus as set forth in claim 1 wherein said positionable means defining the variable throat area comprises
   A. first and second inclinable ramp means adapted to define an apex, and
   B. said positioning means is coupled with said ramp means in a manner to translate said apex across said venturi channel.

6. The apparatus as set forth in claim 5 wherein said first and second ramp means comprise
   A. a first generally linear ramp member having one end thereof pivotally supported adjacent a wall of said venturi channel,
   B. a second generally linear ramp member having one end thereof pivotally supported adjacent said venturi wall, the free ends of said first and second ramp members being pivotally jointed, and
   C. said positioning means being connected to one of said ramp members whereby upon rotation thereof, said pivotal joint of said free ends is translated across said venturi channel.

7. Apparatus for measuring fluid flow velocity over a wide range of velocities comprising
   A. venturi defining means having inlet and outlet portions of fixed, substantially equal cross-sectional areas,
   B. means for mounting said venturi means on a supporting surface,
   C. adjustable means disposed between said inlet and outlet portions and defining a venturi throat portion of variable cross-sectional area, said adjustable means including first and second inclined surfaces defining an apex and providing continuous transitions between said inlet and throat portions and said throat and outlet portions respectively,
   D. means for detecting fluid pressures in said throat portion and in one of said inlet and outlet portions,
   E. means for providing a first signal representative of a ratio of fluid pressures existing at said throat portion and said one of inlet and outlet portions respectively,
   F. means for providing a second signal representative of the position of said adjustable means,
   G. means for combining said second signal in negative feedback relationship with said first signal,
   H. means for positioning said adjustable means in response to the combined first and second signals,
   I. means to produce a third signal representative of the fluid pressure in said one of said inlet and outlet portions,
   J. means to modify said third signal in response to the position of said adjustable means, and
   K. means to produce an equivalent airspeed output signal representative of the modified third signal.

8. The apparatus of claim 7 further characterized in that:
   A. said throat portion includes a longitudinally disposed partition dividing said throat portion into first and second parallel channels,
   B. said adjustable means includes identical means on either side of said partition for adjusting the throat area in both channels simultaneously,
   C. said means for detecting fluid pressures in said throat portion includes individual means for detecting fluid pressures in each of said parallel channels,
   D. said means for providing said first signal responds to the fluid pressure detecting means in only one of said parallel channels,
   E. said mounting means includes rotatable means which permits rotation of the venturi means about a transverse axis lying in the plane of said partition, and follow-up servo means responsive to pressure differences sensed between said individual throat pressure detection means, said servo means being arranged to rotate said venturi means so as to minimize such pressure differences.

9. The apparatus of claim 7 wherein the fluid pressure detecting means includes means for providing logarithmic representations of the throat and inlet portions respectively, and wherein the means for providing the first signal includes means for obtaining the difference of said logarithmic representations.

10. The apparatus of claim 9 wherein the means for providing the second signal includes a linear potentiometer driven by said motor and wherein the signal combining means includes an amplifier responsive to the difference of the first and second signals.

11. The apparatus of claim 10 wherein the means for producing the third signal includes a shaping circuit for extracting the square root of said logarithmic representation of the inlet pressure and wherein said modifying means includes means for effectively multiplying the value of said square root signal by a factor indicative of the displacement of said adjustable means.

12. The apparatus of claim 11 wherein said modifying means includes a potentiometer energized from said shaping circuit and actuated by said motor and wherein said output signal is taken from the adjustable arm of said potentiometer.

13. Apparatus for measuring fluid flow velocity over a wide range of values comprising venturi defining means having inlet and outlet portions of fixed, substantially equal rectangular cross-sectional areas and an intermediate venturi throat portion of variable cross-sectional area, said throat portion including a longitudinally disposed partition dividing said throat portion into first and second parallel channels, first and second inclinable ramp means in each of said channels, each of said first ramp means being mounted on a common rotatable shaft at the junction of the inlet and throat portions of the associated channel, said shaft being transversely disposed in the plane of one wall of said inlet portion, each of said second ramp members being slidingly supported on a transverse pivot pin at the junction of said throat and outlet portions, said pivot pin being mounted in the same wall of the venturi defining means as said rotatable shaft, the free ends of each pair of first and second ramp members being pivotally joined together so as to form a transversely movable apex positionable in accordance with the rotation of said common shaft, means for mounting said venturi defining means on a supporting surface, said mounting means including first servo means for rotating said venturi defining means about a transverse axis lying in the plane of said partition in response to an error signal, means for providing individual electrical signals indicative of the fluid pressures in said inlet portion and in the throat portion of each channel, means for comparing the electrical signals representative of the fluid pressure in the throat portions of the two channels so as to derive an error signal indicative of the difference in fluid flow velocity between the two channels, means to apply said error signal to said first servo means whereby the venturi defining means is rotated until the fluid flow velocity through the two channels is equalized, means for providing an electrical ratio signal indicative of any pressure differential between the inlet portion and the throat portion of one of said channels, means for providing a feedback signal indicative of the transverse position of said movable apex, means for combining said ratio and feedback signals, second servo means for rotating said rotatable shaft in response to any difference between said feedback and ratio signals whereby the position of said movable apex is adjusted until a null signal is applied to said second servo means, shaping circuit means for deriving a signal representative of the square root of the pressure detected in said inlet portion, potentiometer means having an adjustable arm positioned in accordance with the rotation of said rotatable shaft and being energized by said square root signal, and signal output means connected to said adjustable arm.

* * * * *